(12) United States Patent
Feeney

(10) Patent No.: US 7,782,831 B1
(45) Date of Patent: Aug. 24, 2010

(54) SYSTEM AND METHOD FOR DYNAMICALLY DEFINING A TDMA MANAGEMENT CYCLE FOR A WIRELESS NETWORK

(75) Inventor: Michael S. Feeney, Allen, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1377 days.

(21) Appl. No.: 11/229,418

(22) Filed: Sep. 16, 2005

(51) Int. Cl.
*H04B 7/212* (2006.01)

(52) U.S. Cl. ................... 370/347; 370/442; 370/321; 370/326; 370/337; 370/344; 370/345

(58) Field of Classification Search ........... 370/338, 370/344, 442, 321, 337, 347, 326
See application file for complete search history.

(56) References Cited

U.S. PATENT DOCUMENTS

| | | | | |
|---|---|---|---|---|
| 5,719,868 A | * | 2/1998 | Young | 370/436 |
| 6,885,651 B1 | * | 4/2005 | Young | 370/337 |
| 2003/0067906 A1 | * | 4/2003 | Young | 370/347 |

* cited by examiner

*Primary Examiner*—Charles N Appiah
*Assistant Examiner*—John B Byrd, Jr.
(74) *Attorney, Agent, or Firm*—Matthew J. Evans; Daniel M. Barbieri

(57) ABSTRACT

A method for dynamically implementing a TDMA management cycle for a wireless network is described. The method includes communicating between nodes in the wireless network using a time division multiple access structure, the time division multiple access structure including time divisions having time frames, each time frame having a plurality of time slots, the plurality of time slots including TDMA management slots. The method further includes defining a node partition, the node partition including all of the nodes within the wireless network that are able to route messages to each other, defining a TDMA management cycle, the TDMA management cycle configured to include a TDMA management slot assigned to every node within the partition, storing, at each node, an assignment of the node to a TDMA management slot number, and dynamically adapting the size of the TDMA management cycle based on the number of active nodes in the partition, wherein the size of the TDMA management cycle is a multiple of a base cycle.

20 Claims, 11 Drawing Sheets

162 →

| Index | Value | Index | Value | Index | Value |
|---|---|---|---|---|---|
| 0 | 8 | 8 | F | 16 | 24 |
| 1 | 4 | 9 | 7 | 17 | F |
| 2 | F | 10 | 15 | 18 | 1 |
| 3 | 0 | 11 | F | 19 | 2 |
| 4 | 21 | 12 | 6 | 20 | F |
| 5 | F | 13 | 22 | 21 | 27 |
| 6 | 3 | 14 | F | 22 | 5 |
| 7 | 11 | 15 | 29 | 23 | F |

| 7 / 15 | 15 / 5 | 23 / 33 |
| 6 / F | 14 / F | 22 / F |
| 5 / F | 13 / 2 | 21 / F |
| 4 / 3 | 12 / F | 20 / 5 |
| 3 / 21 | 11 / 24 | 19 / 6 |
| 2 / F | 10 / 29 | 18 / F |
| 1 / F | 9 / F | 17 / F |
| 0 / 8 | 8 / 6 | 16 / 1 |

↙ 174

SYSTEM AND METHOD FOR DYNAMICALLY DEFINING A TDMA MANAGEMENT CYCLE FOR A WIRELESS NETWORK

BACKGROUND OF THE INVENTION

The present invention relates generally to the field of network protocols for a wireless network. Specifically, the present inventions related to a system and method for dynamically defining a TDMA management cycle of a network protocol for a wireless network.

A wireless network partition is a group of nodes within a wireless network configured to communicate with other nodes within the partition using a wireless communication protocol. The wireless communication protocol is configured to facilitate communication and prevent interference between nodes that are simultaneously trying to communicate. One exemplary protocol is Time Division Multiple Access (TDMA), a wireless communication protocol configured to allow a number of users (nodes) to access a single radio frequency (RF) channel without interference by allocating unique time slots to each user or node within each partition.

Allocation of the unique time slots to particular nodes may be implemented using an established allocation protocol such as the unifying slot assignment protocol (USAP) protocol which monitors the wireless environment, allocates channel resources on demand from higher-level heuristics, and automatically detects and results contingent resulting from changes in connectivity. The USAP protocol may be implemented using TDMA management messages, containing the USAP information for negotiating traffic slots and resolving conflicts. USAP protocol messages may be transmitted by each node in the partition in specific sections of the TDMA time slots, referred to hereafter as TDMA management slots. TDMA management slots may also be referred to as bootstrap slots.

Each node within the wireless network partition is provided with an opportunity to transmit TDMA management messages during their particular TDMA management slot. A complete cycle, wherein each node in the partition is provided with an opportunity to transmit, is referred to as a TDMA management cycle.

The number of nodes in the wireless network partition may be either fixed, or dynamic. A fixed network partition has a specified number of nodes that are always present and are allocated specific resources. A dynamic network partition does not contain a fixed number of nodes and nodes may join and/or drop out of the partition as needed. A TDMA management cycle for a dynamic network partition must be configured to efficiently manage a TDMA management cycle that is also dynamic to handle the dynamic set of nodes.

Accordingly, what is needed is a system and method for efficiently implementing a dynamic TDMA management slot cycle for a wireless network partition. What is further needed is such a system and method configured to facilitate partition entry, partition merging, and partition exit.

SUMMARY OF THE INVENTION

One embodiment of the invention relates to a method for dynamically implementing a TDMA management cycle for a wireless network. The method includes communicating between nodes in the wireless network using a time division multiple access structure, the time division multiple access structure including time divisions having time frames, each time frame having a plurality of time slots, the plurality of time slots including TDMA management slots. The method further includes defining a node partition, the node partition including, all of the nodes within the wireless network that are able to route messages to each other, defining a TDMA management cycle, the TDMA management cycle configured to include a TDMA management slot assigned to every node within the partition, storing, at each node, an assignment of the node to a TDMA management slot number, and dynamically adapting the size of the TDMA management cycle based on the number of active nodes in the partition, wherein the size of the TDMA management cycle is a multiple of a base cycle.

Another embodiment of the invention relates to a communication system for a wireless network. The communication system including at least one transceiver node arranged in a network and configured to communicate with other transceiver nodes using a time division multiple access protocol, the time division multiple access protocol defining time slots including TDMA management slots and a TDMA management cycle table stored at each of the at least one transceiver nodes, the TDMA management cycle table including assignments of TDMA management slots to transceiver nodes, the TDMA management cycle table being configured to include a number of TDMA management slot entries equal to a multiple of a base cycle.

Another embodiment of the invention relates to a method for dynamically implementing a TDMA management cycle for a wireless network. The method includes communicating between nodes in the wireless network using a time division multiple access structure, the time division multiple access structure including time divisions having time frames, each time frame having a plurality of time slots, the plurality of time slots including TDMA management slots. The method further includes assigning a TDMA management slot to each node, defining a TDMA management cycle to include all of the assigned TDMA management slots, and dynamically adapting the size of the TDMA management cycle based on the number of active nodes in the partition, wherein the size of the TDMA management cycle is a multiple of a base cycle.

BRIEF DESCRIPTION OF THE DRAWINGS

FIG. 3D is an expanded TDMA management table for the partition of FIG. 1 after implementing a partition entry and expansion protocol, according to an exemplary embodiment;

FIG. 4B is a first TDMA management table showing a TDMA management cycle table for the partition of FIG. 1 and a second TDMA management cycle table showing a TDMA management cycle for a new partition, according to an exemplary embodiment;

Figure 1:
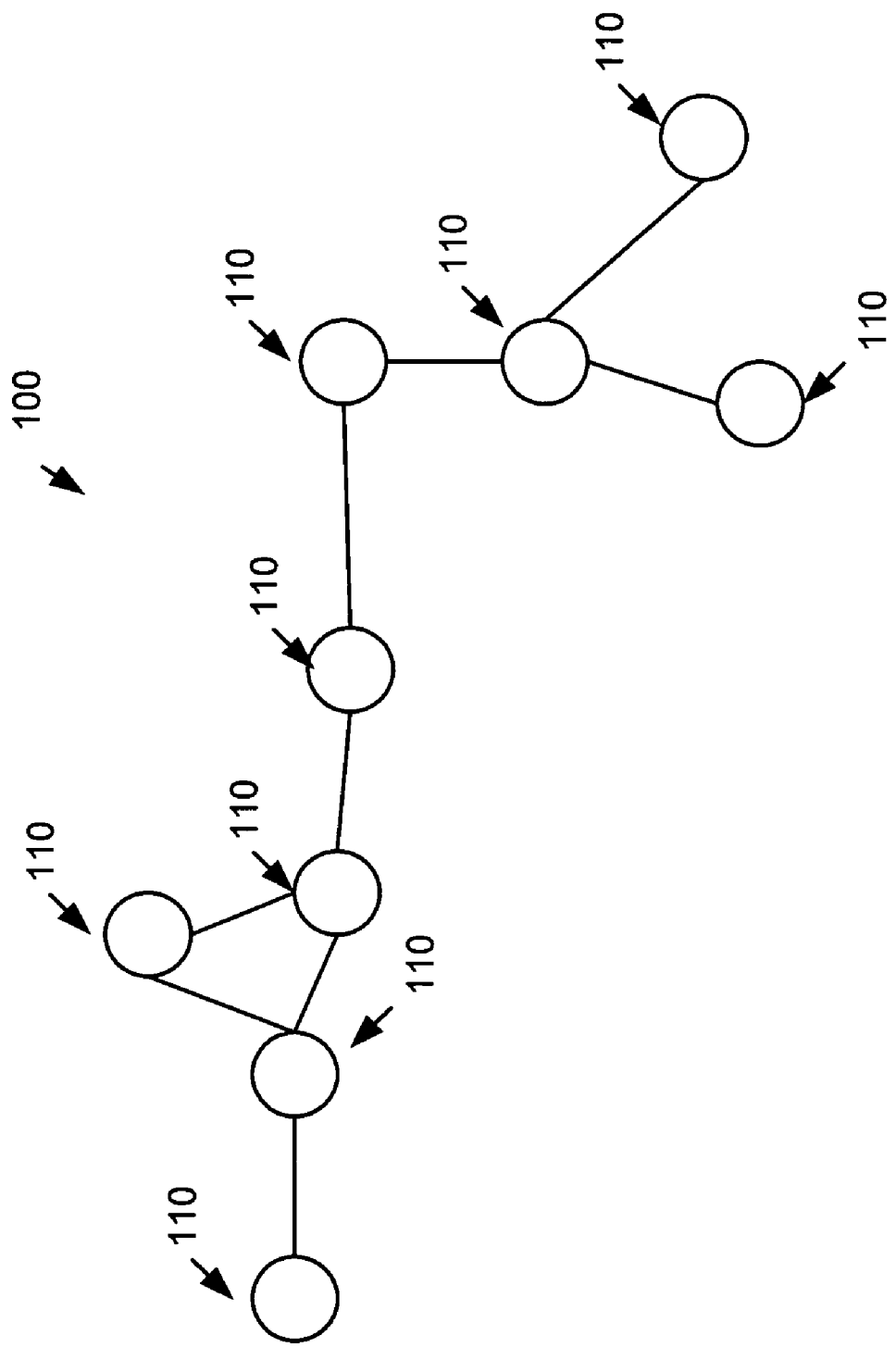
FIG. 1 is a wireless partition configured to implement a wireless communication protocol having a dynamic TDMA management cycle, according to an exemplary embodiment.
Figure 4A:
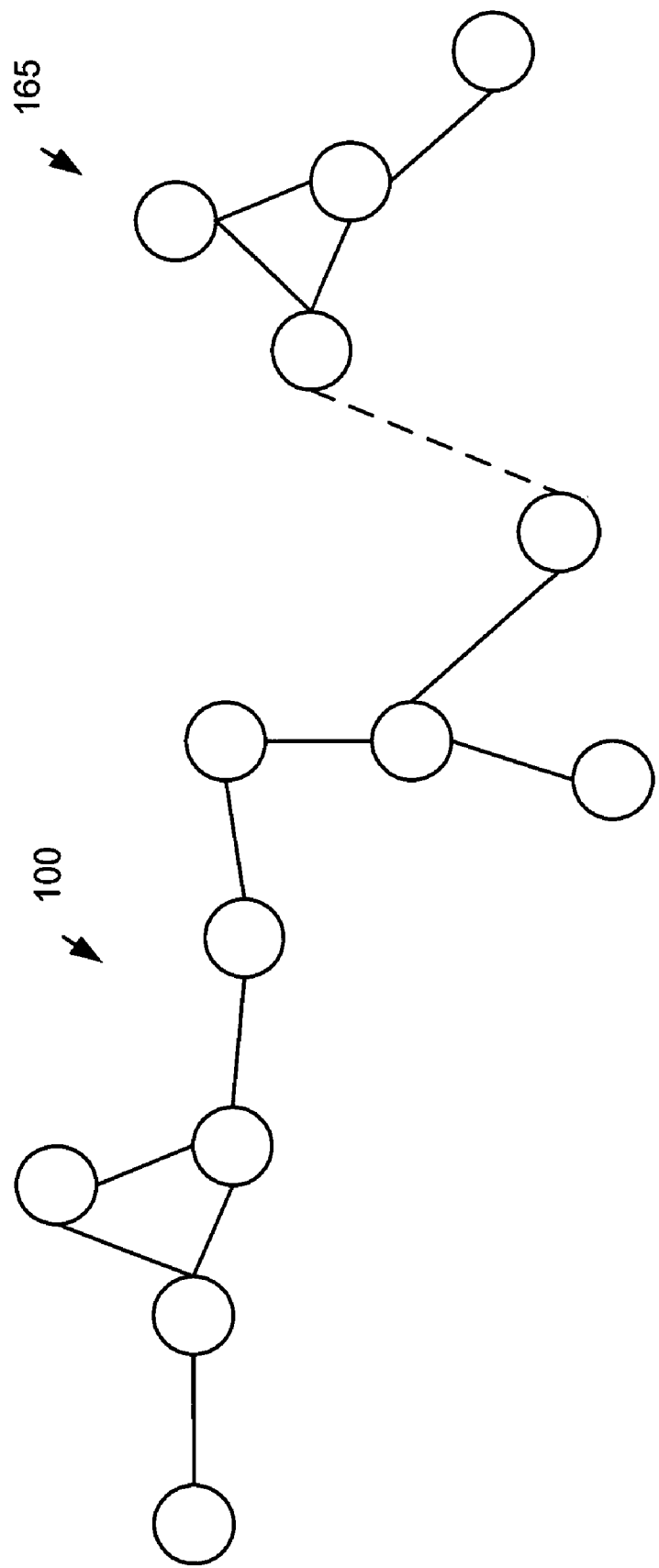
FIG. 4A is a representation of the partition of FIG. 1 merging with a new partition using a partition merge protocol, according to an exemplary embodiment.
Figure 5:
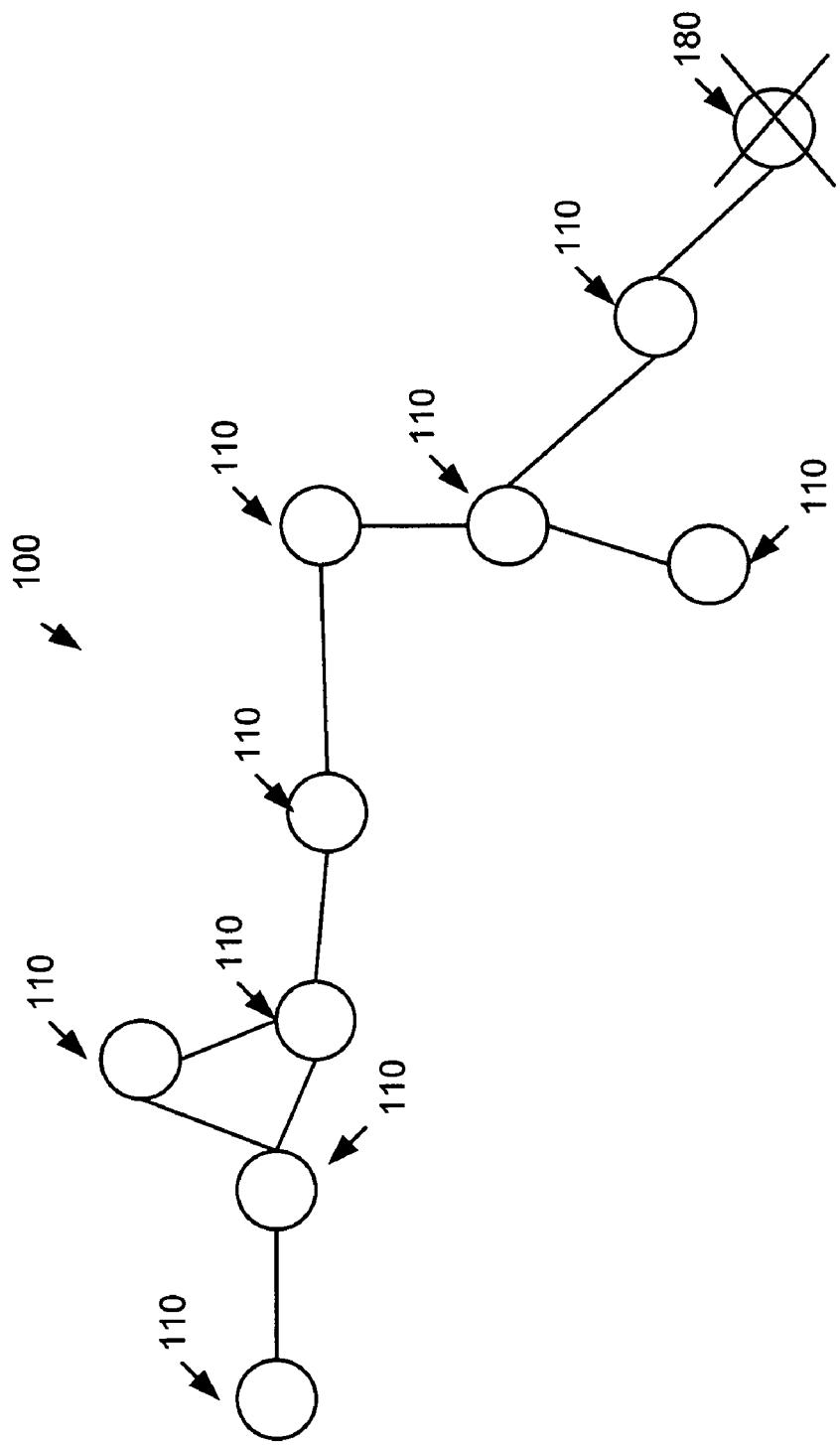
Figure 6:
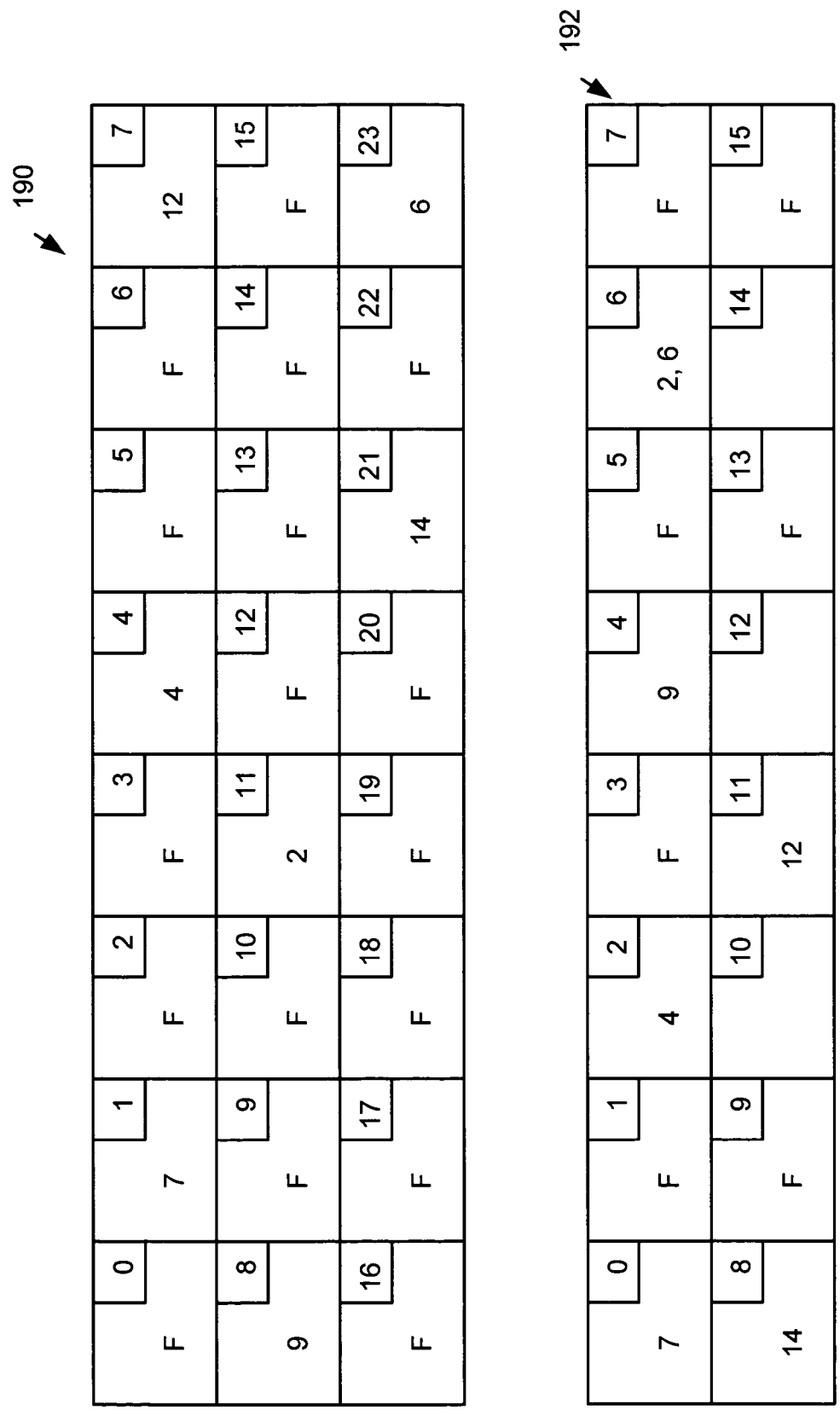

FIG. 4C is an expanded TDMA management table for the newly created merged partitions from FIG. 4A, according to an exemplary embodiment;

FIG. 5 is a representation of the partition of FIG. 1 wherein an exiting node has left the partition, according to an exemplary embodiment; and FIG. 6 is a TDMA management cycle table that includes a number of free TDMA management slots that is greater than the base cycle length for the partition and a contracted TDMA management cycle table illustrating changes to TDMA management cycle table 190 after a TDMA management cycle contraction protocol is shown, according to an, exemplary embodiment.

DETAILED DESCRIPTION OF THE PREFERRED. EMBODIMENTS

Referring to FIG. 1, a wireless partition 100 configured to implement a wireless communication protocol having a dynamic TDMA management cycle is shown, according to an exemplary embodiment. Wireless partition 100 includes a group of computing nodes 110, wherein each computing node is configured to be able to route a TDMA management message to all other nodes within the same partition. Each node 110 is configured to transmit their TDMA management message during an assigned TDMA management slot.

According to exemplary embodiment, computing nodes 110 may be wireless routers. Computing nodes 110 are configured to include at least a processor and a memory configured to implement the protocol described herein.

According to an exemplary embodiment, partition 100 may be defined by a partition ID. The partition ID may further be associated with each of the nodes within partition 100. Each node may be configured to implement the methods and protocols of the partition as defined herein. Accordingly, wherein a step or method is performed by partition 100, the step or method will be performed either individually by a node within partition 100 or collectively by the nodes 110 of partition 100 using standard distributed computing or message propagation techniques that are known in the art.

Figure 2:
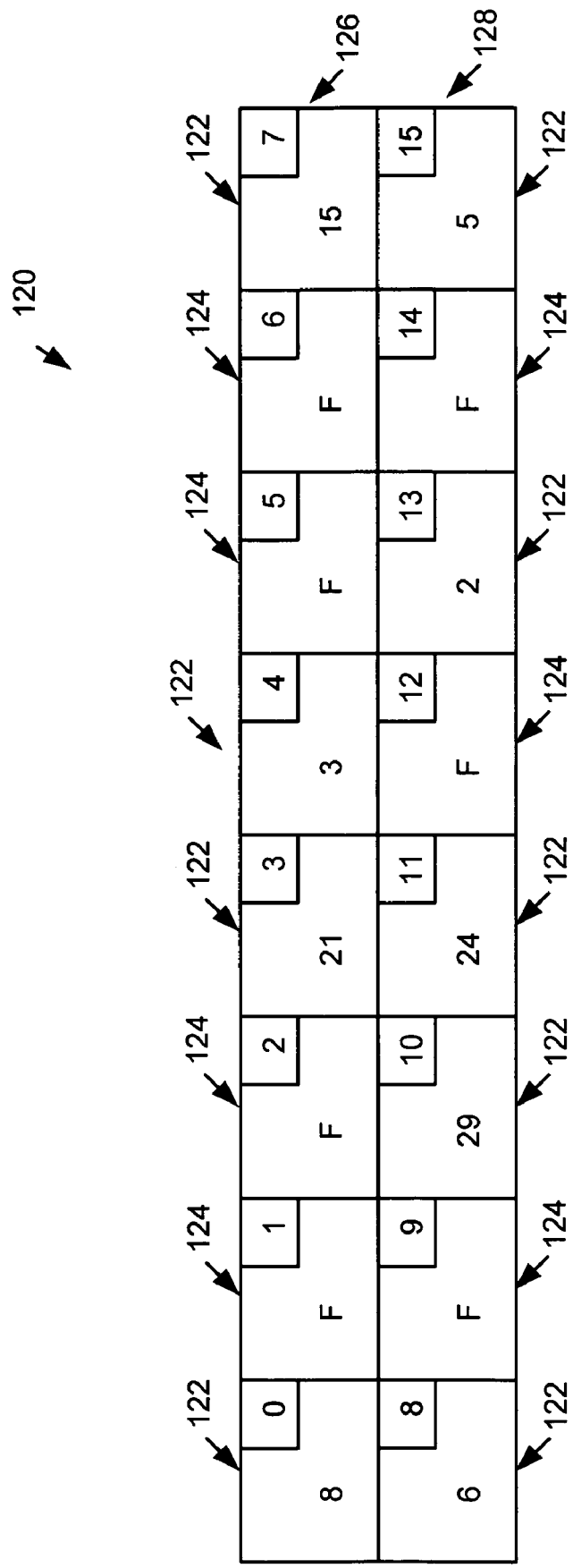
FIG. 2 is a TDMA management cycle table including a listing of both assigned TDMA management slots assigned to nodes associated with the partition of FIG. 1 and "free" TDMA management slots that are not assigned to nodes, according to an exemplary embodiment.

Referring now to FIG. 2, a TDMA management cycle table 120 including a listing of both assigned TDMA management slots 122 assigned to nodes associated with partition 100 and "free" TDMA management slots 124 that are not assigned to nodes is shown, according to an exemplary embodiment. A TDMA management table is a visual representation of a TDMA management cycle where the number of entries in the TDMA management table is representative of the number of nodes in the partition 100 and the number of free TDMA management slots associated with partition 100. The number of columns in the TDMA management table is representative of a base cycle, further defined below. For example, referring to FIG. 2, TDMA management cycle table 120 is associated with a TDMA management cycle of length 16 slots, wherein each TDMA management slot is assigned a unique number zero through 15. The total number of TDMA management slots in TDMA management cycle table 120 may be referred to as the TDMA management cycle length.

Assigned TDMA management slots 122 in table 120 include a node ID of the node assigned to that particular TDMA management slot. For example, first assigned TDMA management slot 122 is assigned to a wireless node having a node ID of eight. The assigned TDMA management slot may be stored by the node associated with that slot. This stored information may further be communicated by the node to the node's neighbors as further discussed below.

Free TDMA management slots 124 are TDMA management slots that are not currently assigned to nodes within partition 100. Free TDMA management slots are configured to be assigned to nodes joining partition 100 in the future or are slots that were associated with nodes that have exited partition 100, both of which are described in further detail below. Because free TDMA management slots 124 are not associated with nodes having particular node IDs, free TDMA management slots 124 are marked with the letter "F" in table 120 to indicate that they are currently free TDMA management slots.

The total number of TDMA management slots in a TDMA management cycle, including both free and assigned TDMA management slots, may be defined according to a base cycle. A base cycle is a fixed number of TDMA management slots. The size of the base cycle may be specific to the wireless network configuration. In general, a base, cycle length may be configured to balance avoidance of a large number of free TDMA management slots with avoidance of an excessive number of expansions and contractions of the TDMA management cycle length. Both an excessive number of free TDMA management slots, and excessive expansion and contraction of the TDMA management cycle may have an adverse effect on the efficiency of the wireless network.

According to the exemplary embodiment shown in FIG. 2, TDMA management cycle table 120 is defined by a base cycle of eight TDMA management slots. Accordingly, TDMA management cycle table 120 includes a first base cycle 126 and a second base cycle 128 where each base cycle is configured to include eight TDMA management slots. In a partition where the total number of TDMA management slots is defined by a base cycle, the TDMA management cycle length is required to be an integer multiple of the base cycle. For example, table 120 includes a TDMA management cycle length of 16 TDMA management slots, a multiple of the base cycle of 8 TDMA management slots.

Partition 100 may be configured such that each node within partition 100 is configured to implement the wireless communication protocol having a dynamic TDMA management cycle. Accordingly, each node within partition 100 may be configured to transmit wireless protocol information during the TDMA management slot. The wireless protocol information may be transmitted in a TDMA management message and include USAP information required to negotiate timeslots, a unique partition identifier, a hop diameter associated with the current partition, where a hop is the range of wireless connectivity where a node may transmit directly to another node and a hop diameter is the largest number of hops between any two nodes within the partition, the current TDMA management slot number, a node ID associated with the TDMA management slot number, the length of the current TDMA management cycle, the number of free slots in the current TDMA management cycle, the slot numbers for the free slots in the current TDMA management cycle, and any other information needed to maintain the listing of TDMA management slots.

The wireless protocol information may further include information configured to allow dynamic implementation of the TDMA management cycle. The dynamic implementation information may include information that is used to prevent collisions or other errors associated with changes in the implementation of the dynamic TDMA management cycle. Exemplary information may include a list of one hop neighboring node IDs and their corresponding TDMA management members, a new TDMA management slot number to be used by this node after the upcoming cycle change (wherein the TDMA management slot number for the current node has been changed), a length of the next TDMA management cycle, a time of the next TDMA management cycle length change, etc.

A dynamic TDMA management cycle is configured to implement the TDMA management cycle for a partition having a dynamic set of nodes. Accordingly, the TDMA management cycle must be configured to handle addition of nodes, realignment of nodes, and/or subtraction of nodes. Addition, subtraction, and realignment of nodes may be implemented such that the TDMA management cycle length remains an integer multiple of the base cycle. Addition of nodes to the partition may include both addition of a single node during a partition entry scenario and/or addition of a multiple nodes associated with a second partition during a partition merge scenario.

Partition Entry Scenario

Figure 3A:
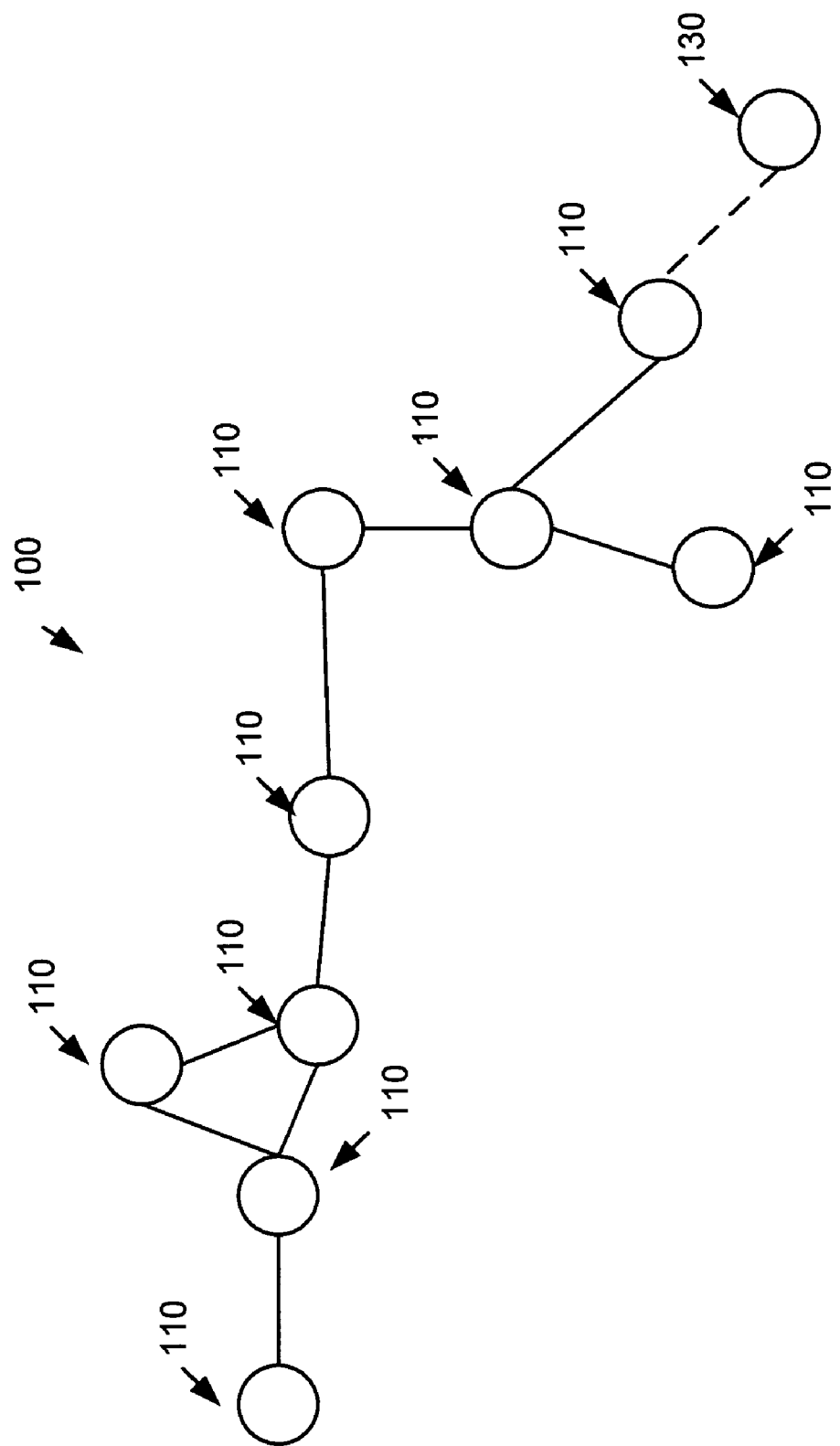
FIG. 3A is a wireless network partition shown where a new node is attempting to join the partition using a partition entry protocol, according to an exemplary embodiment.

Referring now to FIG. 3A, partition 100 is shown where a new node 130 is attempting to join the partition 100 using a partition entry protocol. New node 130 may attempt to join the partition during any number of possible circumstances, such as when new node 130 is first activated, where new node 130 is a mobile mode and first comes within range of the nodes of partition 100, etc. During entry of new node 130, new node 130 may be configured to assigned itself to a free TDMA management slot in the TDMA management cycle table 120. Where a free TDMA management slot is available, new node 130 is assigned to a free TDMA management slot and the node ID of new node 130 replaces the letter F in the TDMA management table 120. Where no free TDMA management slot is available, the TDMA management cycle will be expanded by a multiple of the base cycle to create new free TDMA management slots and new node 130 is assigned to one of these new TDMA management slots. The partition entry protocol is described in further detail below with reference to FIG. 3B. Although a single new node 130 is shown, a partition entry, protocol may be configured to be able to implement the protocol where multiple new nodes are attempting to join simultaneously. In this situation, the number of new TDMA management slots that need to be added to the current cycle may be unknown.

Figure 3B:
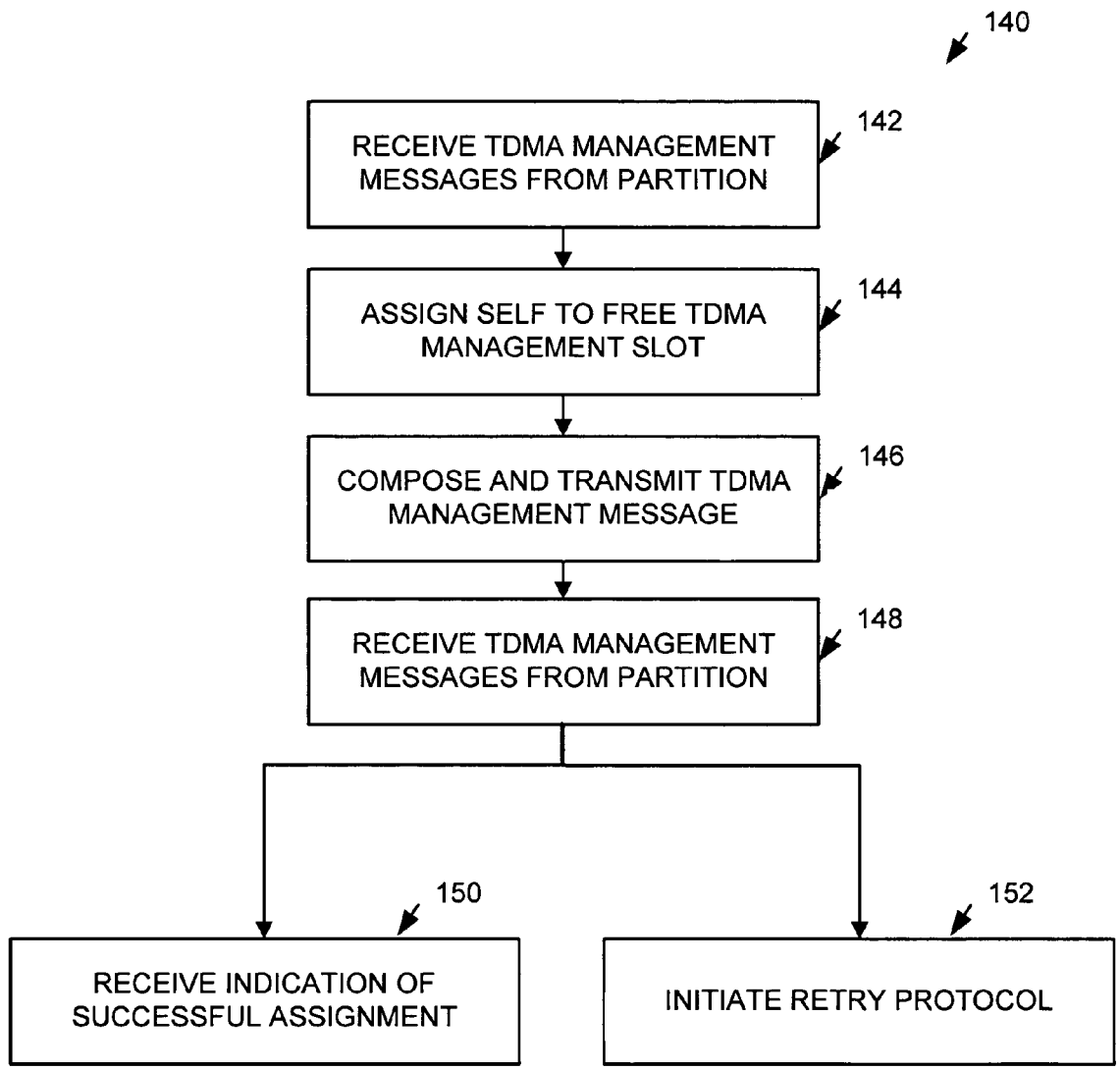
FIG. 3B is a flowchart illustrating a method for implementing a partition entry protocol, according to an exemplary embodiment.

Referring now to FIG. 3B, a flowchart 140 illustrating a method for implementing a partition entry protocol is shown, according to an exemplary embodiment. Although specific steps are shown in a specific order, it should be understood that the method may include more, fewer, and/or a different ordering of the steps described below.

In a step 142, new node 130 is configured to listen to the TDMA management messages of the existing partition for one complete TDMA management cycle. By receiving the TDMA management messages, new node 130 is able to learn the TDMA management slot numbers for the free slots within the cycle from the TDMA management messages of the existing partition. New node 130 may also learn the node IDs of all of its one-hop neighbors within the partition.

New node 130 may also be configured to determine whether any of the nodes has a non-null value for switch over time which may be used to indicate the time until the next cycle change, described above with reference to FIG. 2. If any of the TDMA management messages does not have a null value for the switch-over time, new node 130 may be configured to abort the current partition entry attempt because a change in the TDMA management cycle is already being performed. If new node 130 does abort the current attempt, it may be configured to continue to receive the TDMA management messages of the nodes within partition 100 to determine when the TDMA management cycle change has been completed such that it can resume its partition entry attempt.

Following the completion of the complete TDMA management cycle in step 142, new node 130 may attempt to assign itself to one of the free TDMA management slots in a step 144. It may occur that multiple new nodes will attempt to select the same free node where multiple new nodes 130 are attempting to join partition 100 at the same time. The parallel attempts to select a specific free TDMA management slot will result in a collision. Collision resolution occurs when the collision is detected by the new nodes 130 and/or any other node within partition 100 and is discussed in further detail below.

After selecting a free TDMA management slot, new node 130 composes its own TDMA management message in a step 146. The TDMA management message includes the information described above with reference to FIG. 1 as well as an indication of the newly chosen free TDMA management slot. New node 130 may transmit the TDMA management message during the next TDMA management cycle if the chosen free slot is late enough in the cycle to provide enough time for the creation of the new node TDMA management message and timeslot queuing or in the following cycle if there is not enough time in the next cycle.

Following transmittal of the TDMA management message by new node 130, in a step 148, new node 130 is configured to listen to the TDMA management messages of the existing partition for up to the next two complete TDMA management cycles to determine whether a collision has occurred during the TDMA management message of step 146. Advantageously, listening for up to two complete TDMA management cycles allows for the worst case scenario in which the new node's TDMA management message occurred in a slot near the end of the cycle and the only node receiving the message has a TDMA management slot near the beginning of the cycle. In this scenario, the existing partition member receiving the new TDMA management message would not have enough time to add this new information to its TDMA management message for the next cycle. Accordingly, the new node would not be able to confirm its own TDMA management transmission was successful until the second cycle after the new TDMA management message was transmitted by new node 130.

If new node 130 receives at least one TDMA management message by the end of the two cycle detection period of step 148 which lists new node 130 as a 1-hop neighbor, new node 130 concludes that no collision occurred and that it successfully assigned itself to the formerly free TDMA management slot in a step 150. Once the confirmation is received, new node 130 has become a part of partition 100 and will function as a normal node within partition 100.

If no confirmation is heard by the end of the two cycle period, new node 130 is configured to assume that a collision occurred and will start a iterative retry process in a step 152. The retry process is identical to the original process in steps 142-150, with one exception. In each successive retry process, new node 130 will only attempt to grab a free TDMA management slot if the outcome of a statistical calculation is favorable. The statistical calculation may be based on the results of a random number generator. For example, the statistical calculation may be a 50% chance that a retry will occur and the random number generator is configured to generate a "0" or a "1" where new node will not retry if a "0" is generated and will retry if a "1" is generated or vice versa.

The statistical calculation may be configured such that the percentage chance that a retry will be performed by new node 130 will decrease after each successive collision. This decrease is needed to avoid the scenario where multiple nodes are repeatedly attempting to assign themselves to a last remaining free TDMA management slot and repeatedly colliding. The decrease in the percentage chance has the effect of decreasing the likelihood that collisions will continue to occur by increasingly decreasing the likelihood that two, nodes will be simultaneously attempting to assign themselves to the same free TDMA management slot during the same cycle.

Although the above method describes a situation wherein each node in partition 100 is assigned to a unique TDMA management slot, partition 100 may be configured such that two or more nodes entering partition 100 may be assigned to the same free TDMA management slot without a collision occurring. Partition 100 may be configured to allow this situation to occur so long as each of the new nodes sharing a TDMA management slot are at least two hops away. Each node may transmit within their TDMA management slot without collisions because no other node in the partition will receive a TDMA management message from both nodes with the same TDMA management slot.

The sharing of a TDMA management slot without collision situation may change if the two nodes sharing a TDMA management slot come within one-hop range of, each other. The potential collision can be detected by an intermediary node. The intermediary node may be, configured to detect the potential collision where the list of all one-hop neighbor nodes contains the two slots sharing the same TDMA management slots. In that case, one of the colliding nodes may be released from the shared TDMA management slot and seek re-entry into the partition as a new node using the method of FIG. 3B. It may occur that there are no free slots when new node 130 attempts to join partition 100.

Figure 3C:
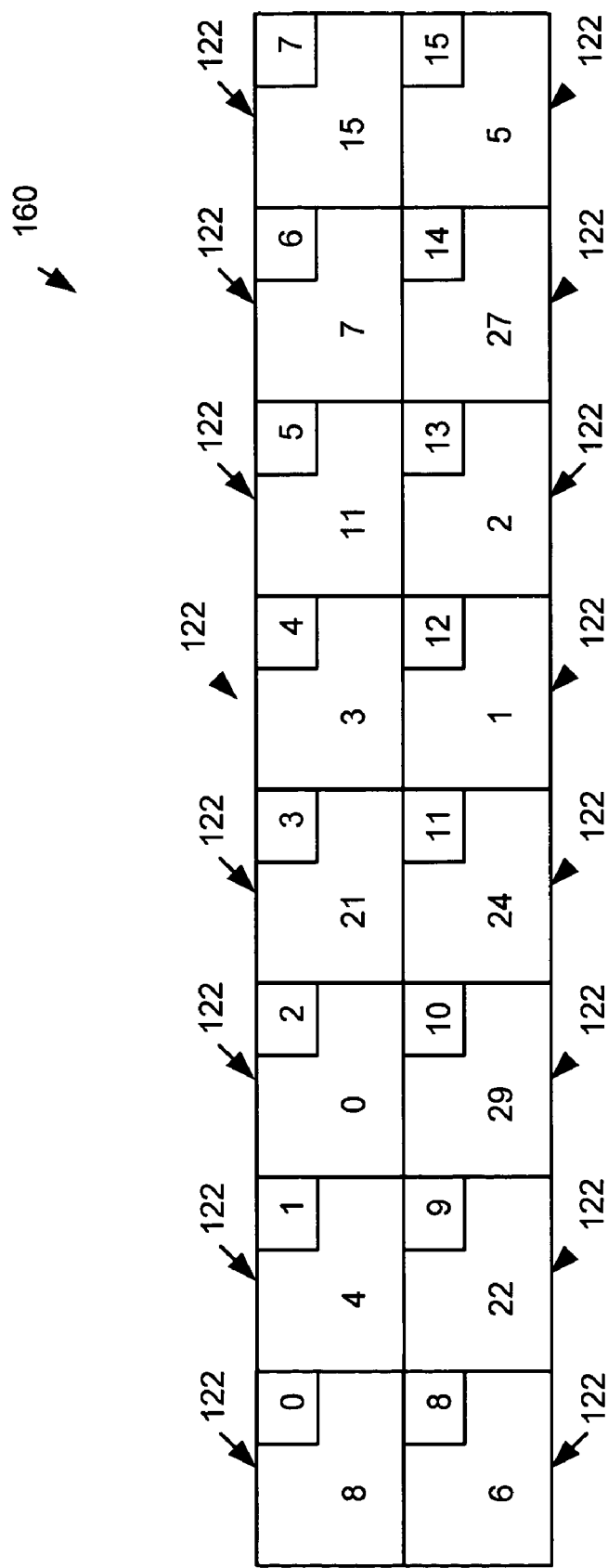
FIG. 3C is a TDMA management table showing a TDMA management cycle for partition having no free TDMA management slots, according to an exemplary embodiment.

Referring now to FIG. 3C, a TDMA management table 160 showing a TDMA management cycle for partition 100 having no free TDMA management slots is shown, according to an exemplary embodiment. TDMA management table 160 includes a TDMA management cycle of 16 slots and a base cycle of 8 slots. As shown in TDMA management table 160, partition 100 may have no available free TDMA management slots. If a new node 130, initiates a partition entry protocol for a partition having TDMA management table 160, a TDMA management cycle expansion will be needed to accommodate the new node 130.

Referring now to FIG. 3D, an expanded TDMA management table 162 for partition 100 after implementing a partition entry and expansion protocol is shown, according to an exemplary embodiment. TDMA management cycle expansion may be implemented within partition 100 by adding a number of new free TDMA management slot equal to the base cycle length. As shown, the expanded TDMA management table 162 includes 8 more TDMA management slots than table 160 of FIG. 3C based on the base cycle length of 8 slots.

Partition entry requiring a partition cycle expansion may include re-mapping of the TDMA management slot assignments based on the change to the state of the partition. Re-mapping the TDMA management slots also includes a determination of which slots will be designated as free slots. Re-mapping the TDMA management slots may be configured such that the new free slots are distributed throughout the TDMA management cycle. Distributing the free slots provides advantages in maintaining timing synchronization an in making the transmissions more random seeming for security reasons.

According to an exemplary embodiment, and as shown in FIG. 3D, re-mapping may include assigning free TDMA management slots to every nth TDMA management slot in the expanded TDMA management table 162 where n is equal to the number of multiples of the base cycle in the TDMA management cycle. For example, as shown in table 162, where a TDMA management cycle is 24 slots for a partition with a base cycle of 8 slots, n is equal to 3 and the free slots with be assigned to every third TDMA management slot in TDMA management table 162. The assigned nodes from table 160 may be assigned to the remaining nodes in table 162 based on their order in table 160. The new node 130 that caused the expansion may be assigned to any of the new free TDMA management slots.

Partition Merge Scenario

Referring now to FIG. 4A, partition 100 is shown merging with a new partition 165 using a partition merge protocol, according to an exemplary embodiment. Partition mergers may occur when two partition move within wireless range of each other allowing TDMA management messages from one partition to be heard by the nodes of the second partition.

A node within partition 100 may be configured to determine the attributes of new partition 165 based on information received in a TDMA management message from a node in new partition 165. As described above with reference to FIG. 1, each TDMA management message may be configured to include the partition ID of its current partition such that messages from a different partition may easily be identified. Further, the number of active nodes and assigned TDMA management slots in new partition 165 may be determined by subtracting the number for free nodes in partition 165 from the size of the partition 165 TDMA management cycle.

To complete a merger, partition 100 may be configured to expand the current TDMA management cycle to include the number of assigned TDMA management slots in partition 165. The length of the new TDMA management cycle may be easily determined by rounding the sum of the assign slots in each partitions TDMA management cycle to the nearest multiple of the base cycle.

The first node within partition 100 to detect the need for the partition merger may be configured to include the new TDMA management cycle information in its TDMA management message such that this information may be propagated to the remaining nodes of partition 100 and partition 165.

Figure 4B:
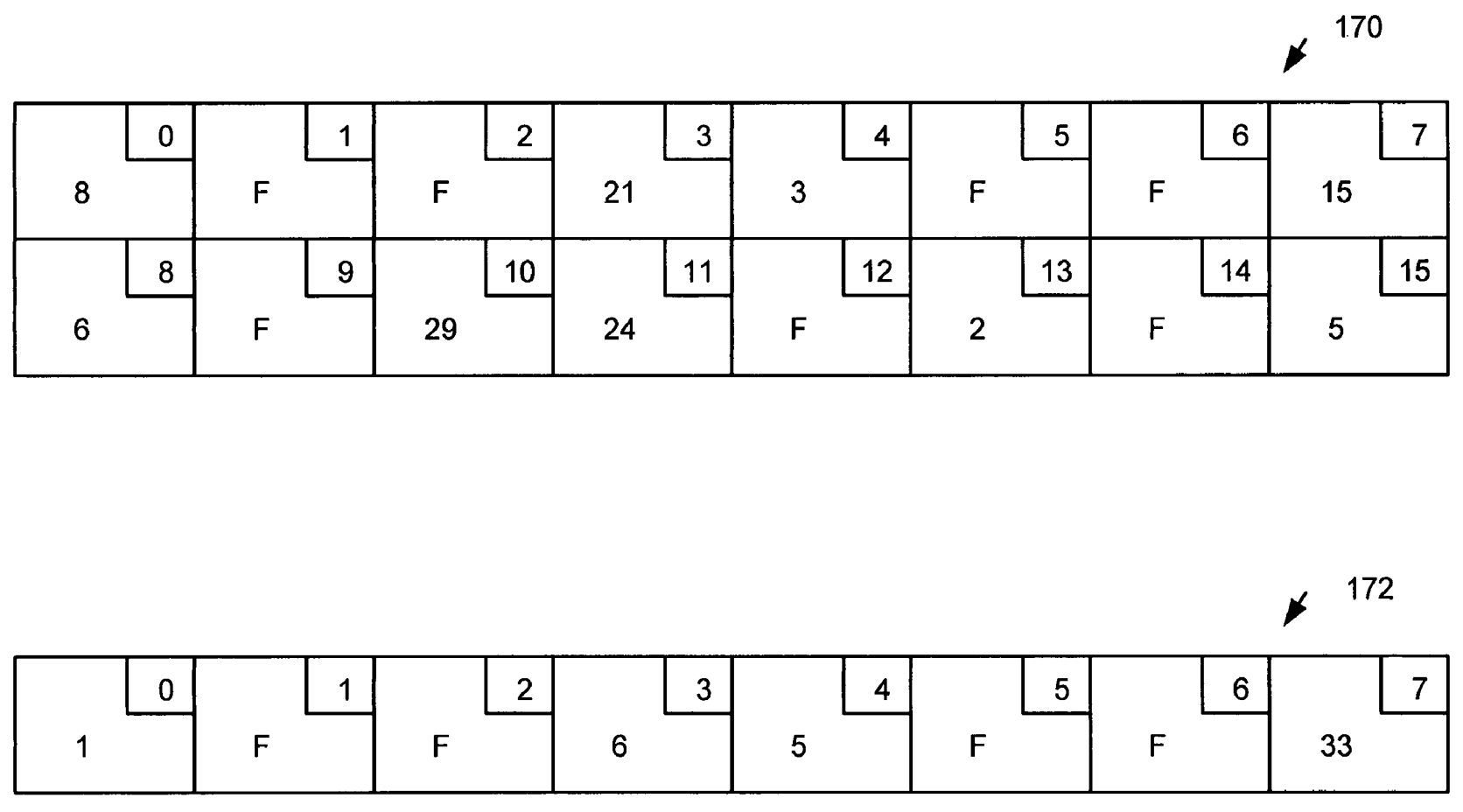

Referring now to FIG. 4B, a first TDMA management table 170 showing a TDMA management cycle for partition 100 and a second TDMA management table 172 showing a TDMA management cycle for partition 165 are shown, according to an exemplary embodiment. Both TDMA management table 170 and TDMA management table 172 include a base cycle, of 8 slots and include both free slots and assigned slots. A partition merge protocol will include a re-mapping protocol to assign TDMA management slots to the nodes of both partition 100 and partition 165 to create the new partition.

Referring now to FIG. 4C, an expanded TDMA management table 174 for the newly created merged partition is shown, according to an exemplary embodiment. The newly merged partition may create TDMA management table 174 by appending table 172 to table 170.

Where two partitions have merged, a scenario may occur wherein the number of free TDMA management slots is greater than the base cycle length. For example, TDMA management table 174 now includes a total of 11 free. TDMA management slots, which is greater than the base cycle length of 8 slots. Accordingly, partition 100 may be configured to implement a base cycle contraction, described below with reference to FIG. 6, following the partition merge protocol.

Partition Exit Scenario

Referring now to FIG. 5, a representation of partition 100 wherein an exiting node 180 is leaving the partition is shown, according to an exemplary embodiment. An exiting, node 180 may leave partition 100 for any of a variety of reasons such as movement out of range of partition 100, node failure, etc. When node 180 exits partition 100, its one-hop neighbors and all other nodes within partition 100 will detect that they are no longer receiving messages from node 180. After a specified number of cycles, the one-hop neighboring nodes will send messages to the other nodes in partition 100 indicating that node 180 has exited and that the TDMA management slot formerly associated with exiting node 180 should be marked as, a free TDMA management slot.

Where a partition exit has occurred, the number of free TDMA management slots after the exit may be greater than the base cycle length. Accordingly, partition 100 may be configured to implement a base cycle contraction as described below with reference to FIG. 6 following the partition merge protocol.

Partition Contraction Scenario

Referring now to FIG. 6, a TDMA management cycle table 190 that includes a number of free TDMA management slots that is greater than the base cycle length for the partition and a contracted TDMA management cycle table 192 illustrating changes to TDMA management cycle table 190 after a TDMA management cycle contraction protocol is shown, according to an exemplary embodiment. This situation may occur as a result of partition merger, a partition exit, and/or a partition split. Partition 100 may be configured to implement a partition contraction protocol where the number of free TDMA management slots is greater than the base cycle length.

A partition contraction protocol may include removing a number of free TDMA management equal to the size of the base cycle length. Removal of the free TDMA management nodes may require remapping of the existing nodes and any remaining free TDMA management slots. The remapping of the existing nodes may be performed so as to maintain the current relative order of the existing nodes from the TDMA management cycle table 190. Maintaining the order may be implemented based on the record stored on each node indicating the TDMA management slot numbers of each of its neighbor's neighbors. After contraction, the TDMA management cycle table 190 may appear as table TDMA management cycle 192.

Each node to be listed in the contracted TDMA management cycle determines its relative order based on the new cycle length and its relative order in the original TDMA management table 190 compared to its neighbors. Because each node is only able to determine its order relative to its neighbors and its neighbor's neighbors, some multiple nodes may be assigned to the same TDMA management slot as shown in table 192. However, similar to the situation described above, with reference to FIG. 3, no collision will occur since the nodes are greater than two hops apart. Where a collision may occur, the intermediate node may be configured to recognize the collision and force one of the colliding nodes to surrender the TDMA management slot.

It should be noted that although flow charts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention, contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links; wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise, form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method for dynamically implementing a TDMA management cycle for a wireless network, the method comprising:
    communicating between nodes in the wireless network using a time division multiple access structure, the time division multiple access structure including time divisions having time frames, each time frame having a plurality of time slots, the plurality of time slots including TDMA management slots;
    defining a node partition, the node partition including all of the nodes within the wireless network that are able to route messages to each other;
    defining a TDMA management cycle, the TDMA management cycle configured to include a TDMA management slot assigned to every node within the partition;
    storing, at each node, an assignment of the node to a TDMA management slot number; and
    dynamically adapting the size of the TDMA management cycle based on the number of active nodes in the partition, wherein the size of the TDMA management cycle is a multiple of a fixed base cycle, the fixed base cycle being more than 2 and the multiple being an integer, wherein the multiple is increased when a free TDMA management slot is not available for a new node and is decreased when a number of free TDMA management slots are greater than or equal to the fixed base cycle.

2. The method of claim 1, wherein defining the TDMA management cycle includes defining one or more free TDMA management slots within the TDMA management cycle, and further including assigning the node joining the partition to the free TDMA management slot.

3. The method of claim 2, further including
determining that the TDMA management cycle does not contain any free TDMA management slots; and
implementing a partition expansion protocol.

4. The method of claim 3, further including
receiving an indication that multiple new nodes have attempted to assign themselves to a free TDMA management slot;
performing a statistical calculation; and
re-attempting to assign a node to the free TDMA management slot based on the result of the statistical calculation.

5. The method of claim 1, further including
detecting a new partition;
implementing a partition merge protocol to combine the partition with the new partition; and
combining the TDMA management cycle of the partition with the TDMA management cycle of the new partition.

6. The method of claim 1, further including
determining that a node has exited the partition; and
changing the TDMA management slot assigned to the exiting node to a free TDMA management slot.

7. The method of claim 6, further including
determining that the number of free TDMA management slots in the TDMA management cycle is greater than the base cycle; and
implement a base cycle contraction protocol.

8. A communication system, comprising:
at least one transceiver node arranged in a network and configured to communicate with other transceiver nodes using a time division multiple access protocol, the time division multiple access protocol defining time slots including TDMA management slots; and
a TDMA management cycle table stored at each of the at least one transceiver nodes, the TDMA management cycle table including assignments of TDMA management slots to transceiver nodes, the TDMA management cycle table being configured to include a number of TDMA management slot entries equal to a multiple of a fixed base cycle, the fixed base cycle being more than 2 and the multiple being an integer, wherein the multiple is increased when a free TDMA management slot is not available for a new node and is decreased when a number of free TDMA management slots are greater than or equal to the fixed base cycle.

9. The communication system of claim 8, wherein the TDMA management cycle table is configured to include one or more free TDMA management slots.

10. The communication system of claim 9, wherein the transceiver node is configured to expand the TDMA management cycle table upon receiving both an indication that the TDMA management cycle does not contain any free TDMA management slots and an indication that a new transceiver node is to be assigned to a TDMA management slot.

11. The communication system of claim 8, wherein the transceiver node is configured to determine whether any two of its one-hop neighbors are assigned to the same TDMA management slot and to force one of the two neighboring nodes to release the TDMA management slot upon detecting the assignment to the same TDMA management slot.

12. The communication system of claim 8, wherein each transceiver node is configured to determining whether a node has exited the partition and to change the TDMA management slot assigned to the exiting node to a free TDMA management slot.

13. The communication system of claim 12, wherein the transceiver node is further configured to determine whether the number of free TDMA management slots in the TDMA management cycle table is greater than the base cycle and implement a base cycle contraction protocol wherein the number of free TDMA management slots is reduced by the base cycle.

14. A method for dynamically implementing a TDMA management cycle for a wireless network, the method comprising:
communicating between nodes in the wireless network using a time division multiple access structure, the time division multiple access structure including time divisions having time frames, each time frame having a plurality of time slots, the plurality of time slots including TDMA management slots;
assigning a TDMA management slot to each node;
defining a TDMA management cycle to include all of the assigned TDMA management slots; and
dynamically adapting the size of the TDMA management cycle based on the number of active nodes in the partition, wherein the size of the TDMA management cycle is a multiple of a fixed base cycle, the fixed base cycle being more than 2 and the multiple being an integer, wherein the multiple is increased when a free TDMA management slot is not available for a new node and is decreased when a number of free TDMA management slots are greater than or equal to the fixed base.

15. The method of claim 14, wherein defining the TDMA management cycle includes defining one or more free TDMA management slots within the TDMA management cycle, and further including assigning the node joining the partition to a free TDMA management slot.

16. The method of claim 15, further including
determining that the TDMA management cycle does not contain any free TDMA management slots; and
implementing a partition expansion protocol.

17. The method of claim 16, further including
receiving an indication that multiple new nodes have attempted to assign themselves to a free TDMA management slot;
performing a statistical calculation; and
re-attempting to assign a node to the free TDMA management slot based on the result of the statistical calculation.

18. The method of claim 17, further including
detecting a new partition;
implementing a partition merge protocol to combine the partition with the new partition; and
combining the TDMA management cycle of the partition with the TDMA management cycle of the new partition.

19. The method of claim 18, further including
determining that a node has exited the partition; and
changing the TDMA management slot assigned to the exiting node to a free TDMA management slot.

20. The method of claim 19, further including
determining that the number of free TDMA management slots in the TDMA management cycle is greater than the base cycle; and
implement a base cycle contraction protocol.

* * * * *